(12) United States Patent
Miyashita et al.

(10) Patent No.: US 7,255,635 B2
(45) Date of Patent: Aug. 14, 2007

(54) POLISHING APPARATUS

(75) Inventors: Tadakazu Miyashita, Nagano (JP);
Harumichi Koyama, Nagano (JP);
Mitsuhiro Nakamura, Nagano (JP)

(73) Assignee: Fujikoshi Machinery Corp., Nagano (JP)

( * ) Notice: Subject to any disclaimer, the term of this patent is extended or adjusted under 35 U.S.C. 154(b) by 0 days.

(21) Appl. No.: 11/345,406

(22) Filed: Feb. 2, 2006

(65) Prior Publication Data
US 2006/0178094 A1 Aug. 10, 2006

(30) Foreign Application Priority Data
Feb. 4, 2005 (JP) ............... 2005-028506

(51) Int. Cl.
*B24B 5/36* (2006.01)
(52) U.S. Cl. .................................. 451/269; 74/465
(58) Field of Classification Search ............... 451/262, 451/268, 269; 74/465
See application file for complete search history.

(56) References Cited

U.S. PATENT DOCUMENTS

| 594,110 | A | * | 11/1897 | Higgins | 74/465 |
| 860,536 | A | * | 7/1907 | Ellingham | 74/465 |
| 1,473,907 | A | * | 11/1923 | Hettrich | 74/414 |
| 2,709,321 | A | * | 5/1955 | Indge | 451/269 |
| 2,792,715 | A | * | 5/1957 | Wojtowicz | 74/465 |
| 4,007,560 | A | * | 2/1977 | Janssen | 451/262 |
| 4,315,383 | A | * | 2/1982 | Day | 451/269 |
| 5,704,248 | A | * | 1/1998 | Knotts | 74/416 |
| 5,944,591 | A | * | 8/1999 | Chen | 451/290 |

FOREIGN PATENT DOCUMENTS

JP 9-239657 A 9/1997

* cited by examiner

*Primary Examiner*—M. Rachuba
(74) *Attorney, Agent, or Firm*—Birch, Stewart, Kolasch & Birch, LLP

(57) ABSTRACT

In polishing apparatus of the present invention, collars can be easily exchange. The polishing apparatus comprises: an outer pin gear having an inner gear section; an inner pin gear having an outer gear section; and a carrier having outer gear teeth, which are engaged with the inner gear section of the outer pin gear and the outer gear section of the inner pin gear so as to rotate and move the carrier around the inner pin gear. At least one of the inner gear section and the outer gear section includes gear teeth, each of which comprises: a pin proper being fixed to a pin ring and extended upward therefrom; a cylindrical collar rotatably covering and fitting the pin proper at a fitting section.

7 Claims, 5 Drawing Sheets

POLISHING APPARATUS

BACKGROUND OF THE INVENTION

The present invention relates to a polishing apparatus, more precisely relates to a polishing apparatus having an outer pin gear and an inner pin gear so as to rotate a carrier holding a workpiece.

Polishing apparatuses are used for simultaneously polishing both side faces of workpieces, e.g., wafer. In such polishing apparatus, a carrier or carriers holding workpieces are rotated between a lower polishing plate and an upper polishing plate, which are independently driven. Therefore, the both side faces of the workpieces can be simultaneously polished.

As shown in FIG. 4, an internal gear 204 and a sun gear 206, which is located at the center of the internal gear 204, are used for rotating carriers 208.

The internal gear 204 and the sun gear 206 are independently rotated. Plate-shaped carriers 208 have outer gear teeth, which are formed on an outer circumferential face thereof. The outer gear teeth are engaged with an inner gear section of the internal gear 204 and an outer gear section of the sun gear 206. With this structure, the carriers 208 are rotated on their axes and moved around the sun gear 206.

As described above, a plurality of the carriers 208 are provided between the internal gear 204 and the sun gear 206, and a plurality of through-holes 207, in which workpieces are held, are formed in each of the carriers 208. Therefore, many workpieces can be polished simultaneously.

In the above described conventional polishing apparatus, the inner gear section of the internal gear 204 and the outer gear section of the sun gear 206 are much-abraded. To solve the problem, an improved polishing apparatus was invented (see Japanese Patent Gazette No. 9-239657).

The improved polishing apparatus has an outer pin gear, which acts as the internal gear, and an inner pin gear, which acts as the sun gear. An outer gear section of the inner pin gear is constituted by a plurality of gear teeth, which are arranged along an outer circumferential face of the inner pin gear. Further, an inner gear section of the outer pin gear is constituted by a plurality of gear teeth, which are arranged along an inner circumferential face of the outer pin gear. Outer gear teeth of carriers are engaged with the inner gear section of the outer pin gear and the outer gear section of the inner pin gear, so that the carriers are rotated on their axes and moved around the inner pin gear.

FIG. 5 is a partial sectional view of the inner pin gear, which shows one gear tooth 306a.

A through-hole 306c is formed in an inner pin ring 306b, which is a main body of the inner pin gear. A pin 314 is pierced through the through-hole 306c from the bottom side and fixed by a nut 315. The pin 314 is upwardly projected from the inner pin ring 306b, and a cylindrical collar 313 rotatably and loosely covers the pin 314. A cap 310, in whose a large diameter head 311 is formed at an upper end, is screwed with an upper end part of the pin 314 so as to hold the collar 313.

The structures of the gear teeth of the outer pin gear are the same as those of the gear teeth 306a of the inner pin gear.

In the gear teeth of the outer pin gear and the inner pin gear, the collars 313 are engaged with outer gear teeth of the carriers and rotated around the pins 314. Therefore, frictions working to the collars 313 can be reduced, and abrasion of the collar 313 can be reduced. Namely, durability of the inner pin gear and the outer pin gear can be improved.

However, abrasion of the collars 313, which occurs from prolonged use, cannot avoid. The abraded collars 313 must be exchanged with new ones. To exchange the collar 313, firstly the cap 310 is detached from the pin 314, the abraded collar 313 is removed, the new collar 313 is attached to the pin 314, then the cap 310 is screwed again. It is troublesome for an operator to exchange the collars. Especially, in case of a large polishing apparatus, about 100 gear teeth are provided to the inner pin gear and the outer pin gear respectively, it takes a long time to exchange all of the collars 313.

SUMMARY OF THE INVENTION

The present invention was conceived to solve the above described problem.

An object of the present invention is to provide a polishing apparatus, in which collars can be easily exchange.

To achieve the object, the present invention has following structures.

Namely, the polishing apparatus of the present invention comprises:

an upper polishing plate for polishing a workpiece;

a lower polishing plate for polishing the workpiece;

an outer pin gear having an inner gear section;

an inner pin gear having an outer gear section; and a carrier holding the workpiece, the carrier having outer gear teeth, which are engaged with the inner gear section of the outer pin gear and the outer gear section of the inner pin gear so as to rotate the carrier on its axis and move the carrier around the inner pin gear, and at least one of the inner gear section and the outer gear section includes a plurality of gear teeth, which are arranged at regular intervals and each of which comprises: a pin ring; a pin proper being fixed to the pin ring and extended upward therefrom; a cylindrical collar having a closed top end and an opened bottom end, the collar rotatably covering and fitting the pin proper at a fitting section.

With this structure, the collars can be easily exchanged.

In the polishing apparatus, the fitting section may be constituted by a concave part of the collar and a projected part of the pin proper. By employing the polishing apparatus of the present invention, the collars can be easily exchanged so that working efficiency can be highly improved.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

The polishing apparatus of the present embodiment is capable of simultaneously polishing both side faces of workpieces, e.g., wafers. In the polishing apparatus, a lower polishing plate and an upper polishing plate are independently rotated, and plate-shaped carriers holding the workpieces are rotated between the lower polishing plate and the upper polishing plate. Therefore, the both side faces of the workpieces can be simultaneously polished by the polishing plates.

Figure 3:
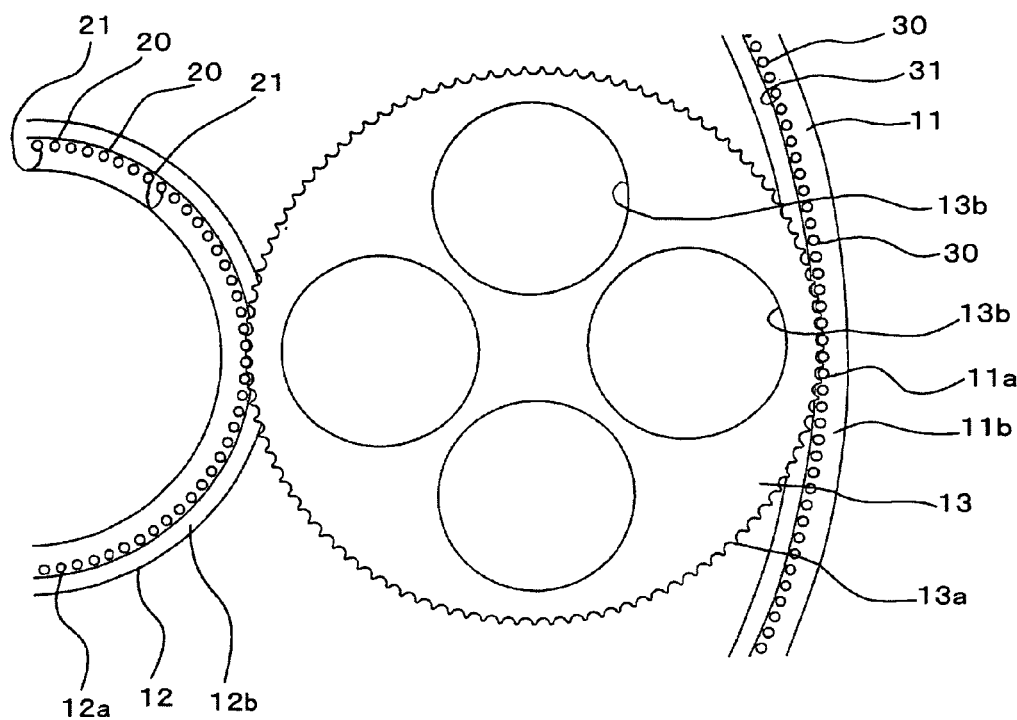
FIG. 3 is a partial plan view showing an arrangement of an inner pin gear, a carrier and an outer pin gear.
Figure 4:
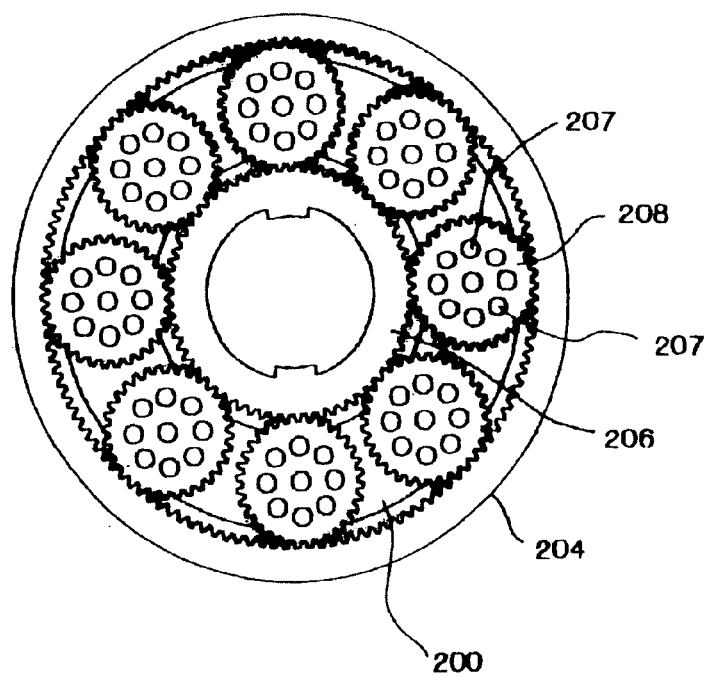
FIG. 4 is a plan view of a sun gear, carriers and an internal gear of the conventional polishing apparatus.

As shown in FIG. 3, the carriers 13 are rotated by an outer pin gear 11 and an inner pin gear 12, which is located at the center thereof.

The outer pin gear 11 and the inner pin gear 12 are independently rotated. Outer gear teeth 13a are formed on an outer circumferential face of each carrier 13. The outer gear teeth 13 are engaged with an inner gear section 11a of the outer pin gear 11 and an outer gear section 12a of the inner pin gear 12, so that the carriers 13 a are rotated on their axes and moved around the inner pin gear 12.

A plurality of the carriers 13 are arranged between the outer pin gear 11 and the inner pin gear 12. A plurality of through-holes 13b, in each of which a workpiece to be polished will be held, are formed in each carrier 13. Therefore, a large number of workpieces can be polished simultaneously.

Next, the inner pin gear 12 will be explained.

The inner pin gear 12 includes an inner pin ring (pin ring) 12b, which is a main body of the gear and formed into a circular disk. The outer gear section 12a is constituted by a plurality of gear teeth 20. Each of the gear teeth 20 comprises: a pin proper 22 fixed to the inner pin ring 12b and projected upward therefrom; and a collar 23 rotatably covering the pin proper 22 (see FIGS. 1A and 1B). The gear teeth 20 are arranged, in the circumferential direction of the inner pin ring 12b, at regular intervals.

As shown in FIG. 3, a plurality of through-holes 21 are formed along an outer circumferential edge of the inner pin ring 12b at regular intervals. Each of the through-holes 21 is located at a prescribed position, which is inwardly separated a prescribed distance from the outer circumferential edge of the inner pin ring 12b. The pin propers 22 of the gear teeth 20 are respectively fixed in the through-holes 21 and projected upward from the inner pin ring 12b (see FIG. 1B).

Figure 1A:
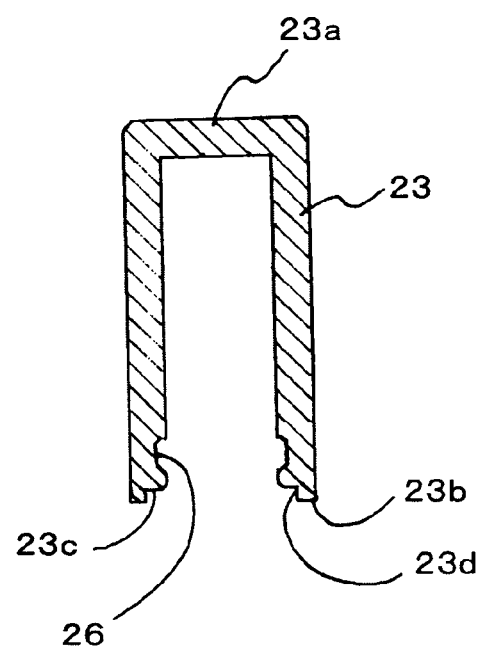
FIG. 1A is a sectional view of a collar.
Figure 1B:
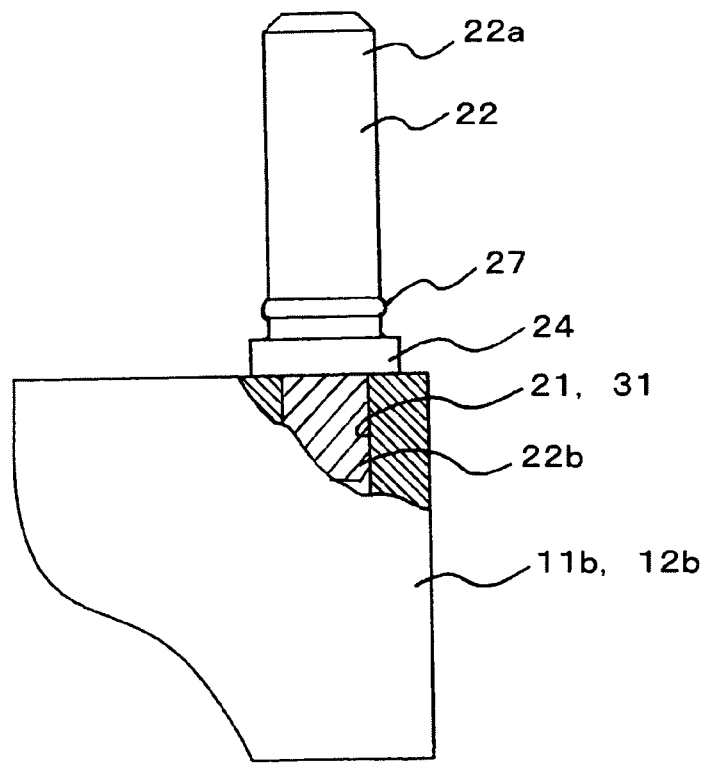
FIG. 1B is a front view of a pin proper with a portion broken away for clarity.

FIG. 1A is a sectional view of the collar 23 of the gear tooth 20, and FIG. 1B is a front view of the pin proper 22 thereof, in which a portion broken away for clarity.

The pin proper 22 has a flange 24, which is circularly extended outward form an outer circumferential face thereof. The flange 24 is located at an axial mid part of the pin proper 22, and small diameter parts 22a and 22b are respectively formed on the upper side and the lower side of the flange 24. An outer circumferential edge of an upper end face of the pin proper 22 is chamfered.

The pin proper 22 is fixed in the through-hole 21 by press fitting. Namely, a lower face of the flange 24 of the pin proper 22 contacts an upper face of the inner pin ring 12b, the small diameter part 22b, which is located on the lower side of the flange 24, is press-fitted in the through-hole 21, and the small diameter part 22a, which is located on the upper side of the flange 24, is projected upward from the inner pin ring 12b. The pin proper 22 is located and fixed in the through-hole 21 in such state.

On the other hand, the collar 23 is formed into a cylindrical shape as shown in FIG. 1A. A top end 23a of the collar 23 is closed; a bottom end 23b thereof is opened. An inner circumferential edge of the opened bottom end 23b is full circularly cut so as to form a recess 23d. By forming the recess 23d, an inner bottom face 23c, which faces downward, is formed in the collar 23.

Figure 2A:
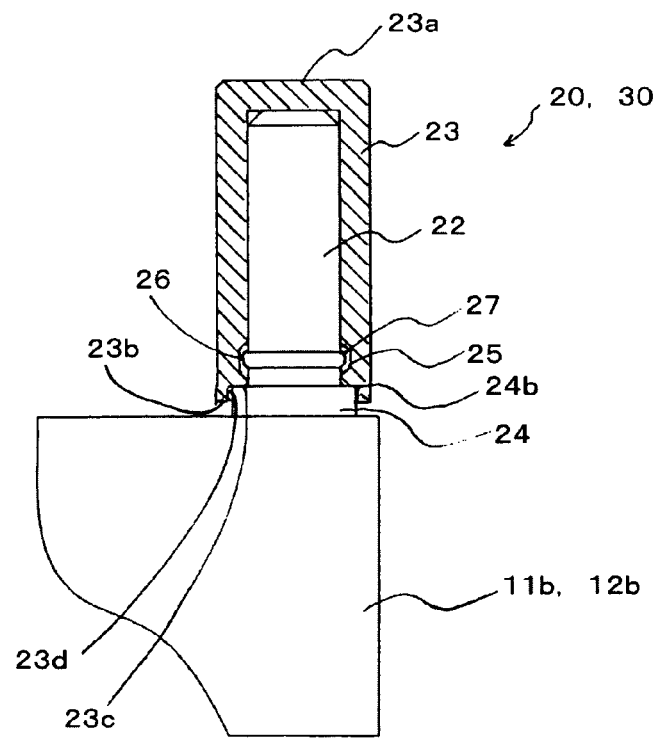
FIGS. 2A and 2B are sectional views of a gear tooth.
Figure 2B:
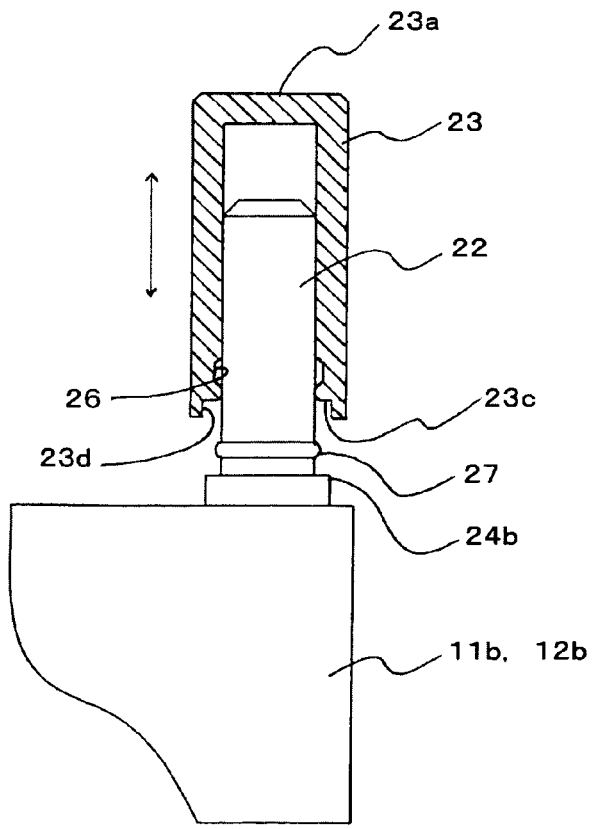

As shown in FIG. 2B, the closed top end 23a of the collar 23 faces upward. In this state, the collar 23 rotatably covers the pin proper 22, which is fixed to the inner pin ring 12b. The closed top end 23a of the collar 23 contacts the upper end of the pin proper 22, so that the collar 23 is supported by the pin proper 22. Namely, an inner face of the top end 23a of the collar 23 contacts the upper end face of the pin proper 22, and a small gap is formed between the bottom end 23b of the collar 23 and the inner pin ring 12b when the collar 23 is attached to the pin proper 22.

An upper edge 24b of the flange 24 is full circularly accommodated in the recess 23d, but a small gap is formed between the inner bottom face 23c of the collar 23 and the upper face of the flange 24.

The collar 23 is fitted with the pin proper 22 at a fitting section 25 so as to prevent the collar 23 from pulling out from the pin proper 22. The fitting section 25 is constituted by a concave part 26 of the collar 23 and a projected part 27 of the pin proper 22. Note that, the projected part may be formed in the collar 23, and the concave part may be formed in the pin proper 22. In any cases, the projected part is loosely fitted in the concave part. The fitting section 25 prevents the collar 23 from notably rising from the pin proper 22 without interfering the rotation of the collar 23, which is engaged with the outer gear teeth 13a of the carrier 13. Further, the collar 23 can be easily attached to and detached from the pin proper 22 by the fitting section 25.

The fitting section 25 of the gear tooth 20 shown in FIGS. 1A, 1B, 2A and 2B is constituted by the projected part 27 of the pin proper 22 and the concave part 26 of the collar 23.

The projected part 27 is outwardly projected from the outer circumferential face of the pin proper 22. The projected part 27 may be full circularly formed in the outer circumferential face of the pin proper 22. In another case, a plurality of the projected parts 27 may be partially projected from the outer circumferential face of the pin proper 22.

Preferably, the projected part 27 is located in a lower section of the small diameter part 22a, which is projected from the inner pin ring 12b. With this structure, the collar 23 can be easily fitted to the pin proper 22.

On the other hand, the concave part 26 is formed in an inner circumferential face of the collar 23. The position of the concave part 26 corresponds to the projected part 27 of the pin proper 22. The concave part 26 is formed by full circularly cutting the inner circumferential face of the collar 23.

When the collar 23 is attached to the pin proper 22, the collar 23 is mounted on the pin proper 22 to cover the pin proper 22, then the collar 23 is pushed downward so that the projected part 27 of the pin proper 22 is fitted in the concave part of the collar 23 (see FIG. 2A).

In this state, the collar 23 is held by the fitting section 25 and rotatably covers the pin proper 22.

On the other hand, when the collar 23 is detached from the pin proper 22, the collar 23 is pulled upward with respect to the pin proper 22 fixed to the inner pin ring 12b. Then, the projected part 27 is disengaged from the concave part 26, so that the collar 23 can be detached from the pin proper 22.

The pin proper 22 may be made of a metal, plastic, etc. The collar 23 may be made of a metal, plastic, ceramic, etc. If the collar 23 is made of an elastic material, the collar 23 can be easily attached to and detached from the pin proper 22. Preferably, the pin proper 22 is made of a metal, and the collar 23 is made of plastic having proper elasticity.

Next, the outer pin gear 11 will be explained. As shown in FIG. 3, the outer pin gear 11 includes an outer pin ring (pin ring) 11b, which is a main body of the gear and formed into a donut-shaped disk. The inner gear section 11a is constituted by a plurality of gear teeth 30. Each of the gear teeth 30 comprises: a pin proper fixed to the outer pin ring 11b and projected upward therefrom; and a collar rotatably covering the pin proper.

As shown in FIG. 3, a plurality of through-holes 31 are formed along an inner circumferential edge of the outer pin ring 11b at regular intervals. Each of the through-holes 31 is located at a prescribed position, which is outwardly separated a prescribed distance from the inner circumferential edge of the outer pin ring 11b. The pin propers of the gear teeth 30 are respectively fixed in the through-holes 31 and projected upward from the outer pin ring 11b. Therefore, the gear teeth 30 are arranged in the circumferential direction of the outer pin ring 11b at regular intervals. The structure of the gear tooth 30 of the outer pin gear 11 is the same as that of the gear tooth 20 of the inner pin gear 12 shown in FIGS. 1A, 1B, 2A and 2B.

When the gear teeth 20 of the inner pin gear 12 and the gear teeth 30 of the outer pin gear 11 are engaged with the outer gear teeth 13a of the carrier 13, the collars 23, which rotatably cover the pin proper 22, directly contacts the outer gear teeth 13a and rotate on the pin proper 22.

Effects of the present embodiment will be explained.

Figure 5:
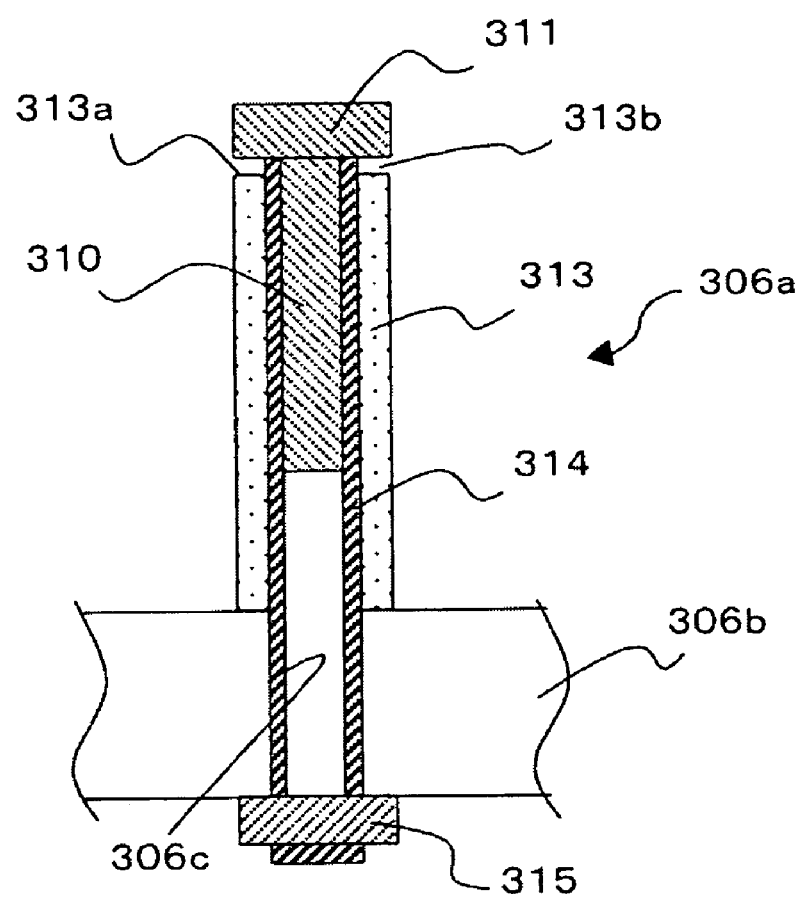
FIG. 5 is a sectional views of the conventional gear tooth.

Cap for holding the collars 23 can be omitted, so that number of parts can be reduced, the structure of the polishing apparatus can be simplified, and the collars 23 can be easily exchanged. For example, in case of a polishing apparatus including the outer pin gear 11 having 300 gear teeth and the inner pin gear 12 having 100 gear teeth, if the gear teeth have the conventional structure shown in FIG. 5, number of the caps 310 is equal to number of the gear teeth of the outer pin gear and the inner pin gear, so it is very troublesome for a worker to manage a large number of the small caps 310. Further, the caps 310 must be loosened and tightened for each of the collars 313 to be exchanged, so working efficiency must be low. On the other hand, in the present embodiment, no caps 310 are employed in the gear teeth 20 and 30, so parts can be easily managed. Further, the collars 23 can be easily attached to and detached from the pin propers 22 by covering and pulling the collars 23, so that working efficiency can be highly improved.

In the conventional gear tooth 306a (see FIG. 5), a polishing liquid, e.g., slurry, enters a space between the collar 313 and the pin proper 314 via a gap between the collar 313 and the cap 310 and solidifies therein. The solidified matter often interferes the rotation of the collar 313. On the other hand, in the present embodiment, the collar 23, whose top end 23a is closed, covers the pin proper 22, and no gaps and spaces in the upper part, so that no polishing liquid enters a space between the collar 23 and the pin proper 22. Therefore, smooth rotation of the collars 23 can be stably maintained for a long time.

Since the upper edge 24b of the flange 24 is accommodated in the recess 23d, which is formed in the lower part of the collar 23, the invasion of the polishing liquid can be effectively prevented.

Successively, other embodiments of the gear teeth 20 and 30 of the pin gears 11 and 12 will be explained.

The pin propers 22 may be fixed to the pin rings 11b and 12b by screws.

In the above described embodiment, the inner face of the top end 23a of the collar 23 contacts the upper end face of the pin proper 22 when the collar 23 is attached to the pin proper 22. But, the present invention is not limited to this structure. The bottom end 23b of the collar 23 may contact the pin ring 11b or 12b so as to support the collar 23 by the pin ring 11b or 12b. Namely, the bottom end 23b of the collar 23 contacts the pin ring 11b or 12b, and a space may be formed between the inner face of the top end 23a and the upper end face of the pin proper 22. With this structure, no gap is formed between the collar 23 and the pin proper 22, so that the invasion of the polishing liquid can be securely prevented.

The inner bottom face 23c of the collar 23 may contact the upper face of the flange 24 so as to support the collar 23 by the pin proper 22. Namely, if the inner bottom face 23c of the collar 23 contacts the upper face of the flange 24, gaps may be formed between the inner face of the top end 23a and the upper end face of the pin proper 22 and between the bottom end 23b and the pin ring 11b or 12b. In this case too, the invasion of the polishing liquid can be securely prevented.

Figure 6A:
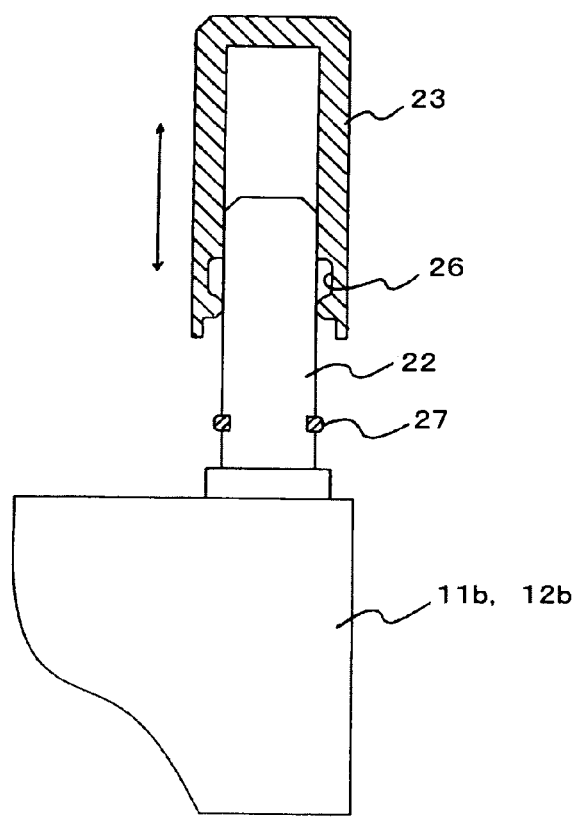
FIGS. 6A and 6B are sectional views of the gear tooth of another embodiment.
Figure 6B:
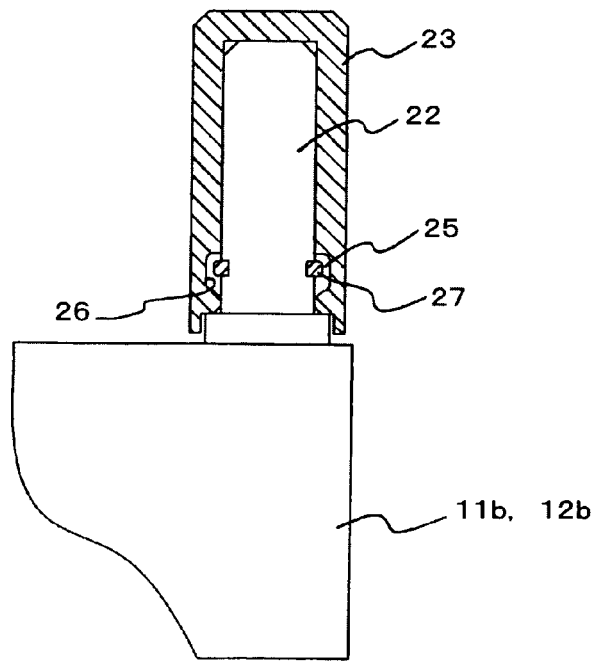

Another fitting section 25 will be explained with reference to FIGS. 6A and 6B. The pin proper 22 is made of a metal, and the collar 23 is made of ceramic. The fitting section 25 is constituted by the projected part 27 of the pin proper 22 and the concave part 26 of the collar 23. The projected part 27 is made of plastic or rubber having enough elasticity and circularly projected from the outer circumferential face of the pin proper 22. If the pin proper 22 and the collar 23 are made of a metal or ceramic having no elasticity, the projected part 27 cannot be easily fitted with the concave part 26. Thus, the collar 23 having the concave part 26 or the pin proper 22 having the projected part 27 is made of an elastic material, e.g., plastic having enough elasticity, so that the projected part 27 can be easily fitted in and disengaged from the concave part 26, so that the collar 23 can be easily attached to and detached from the pin proper 22.

The gear teeth of the outer pin gear or the gear teeth of the inner pin gear may have the above described structures.

In the above described embodiment, the upper polishing plate and the lower polishing plate are independently rotated. In another case, the lower polishing plate may be rotated, and the upper polishing plate may be fixed.

The upper polishing plate, the lower polishing plate, the outer pin gear and the inner pin gear may be rotated by independent driving sources, e.g., motors. Further, a power of one driving source may be transmitted to the upper polishing plate, the lower polishing plate, the outer pin gear and the inner pin gear by gears and clutches.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A polishing apparatus, comprising:
an upper polishing plate for polishing a workpiece;
a lower polishing plate for polishing the workpiece;
an outer pin gear having an inner gear section;
an inner pin gear having an outer gear section; and
a carrier holding the workpiece, said carrier having outer gear teeth, which are engaged with the inner gear section of said outer pin gear and the outer gear section of said inner pin gear so as to rotate said carrier on its axis and move said carrier around said inner pin gear,
wherein at least one of the inner gear section and the outer gear section includes a plurality of gear teeth, which are arranged at regular intervals and each of which comprises:
  a pin ring;
  each of the gear teeth being composed of a pin proper that is fixed to the pin ring and extended upward therefrom; and
  a cylindrical collar having a closed top end and an opened bottom end rotatably covering and fitting the pin proper at a fitting section,
  wherein the top of the collar and the cylindrical sidewall of the collar are formed on one piece, to prevent fluids from entering between the collar and the pin proper.

2. The polishing apparatus according to claim 1, wherein the fitting section is constituted by a concave part of the collar and a projected part of the pin proper.

3. The polishing apparatus according to claim 1, wherein a flange is outwardly extended from a lower part of the pin proper, and a recess, which is capable of accommodating the flange, is formed along an inner edge of the opened bottom end of the collar.

4. The polishing apparatus according to claim 2, wherein a flange is outwardly extended from a lower part of the pin proper, and a recess, which is capable of accommodating the flange, is formed along an inner edge of the opened bottom end of the collar.

5. The polishing apparatus according to claim 1, wherein the collar is made of plastic, and the pin proper is made of a metal.

6. The polishing apparatus according to claim 1, wherein the collar is made of a metal or ceramic, and the pin proper is made of plastic.

7. The polishing apparatus according to claim 2, wherein the collar is made of a metal or ceramic, and the projected part of the pin proper is made of plastic or rubber.

* * * * *